United States Patent [19]

Forrest et al.

[11] Patent Number: 4,839,189

[45] Date of Patent: Jun. 13, 1989

[54] METHOD OF ENHANCING THE BITTERNESS OF BEER

[75] Inventors: Ian S. Forrest; James C. Seaton, both of Midlothian; Michael Moir, Edinburgh, all of Scotland

[73] Assignee: Scottish & Newcastle Breweries p/c, Edinburgh, Scotland

[21] Appl. No.: 147,732

[22] Filed: Jan. 4, 1988

Related U.S. Application Data

[63] Continuation of Ser. No. 721,927, Apr. 11, 1985, Pat. No. 4,717,580.

[30] Foreign Application Priority Data

Apr. 12, 1984 [GB] United Kingdom ............... 8409498

[51] Int. Cl.$^4$ .............................................. C12C 3/00
[52] U.S. Cl. .................................... 426/600; 426/520; 426/651
[58] Field of Search ............... 426/600, 651, 386, 387, 426/520, 655

[56] References Cited

U.S. PATENT DOCUMENTS

| | | | |
|---|---|---|---|
| 3,751,266 | 8/1973 | Kurotwa et al. | 426/600 |
| 3,977,953 | 8/1976 | von Hirsh et al. | 426/600 |
| 4,298,626 | 11/1981 | Laws et al. | 426/600 |
| 4,342,791 | 8/1982 | Baker | 426/600 |

FOREIGN PATENT DOCUMENTS

| | | | |
|---|---|---|---|
| 1236731 | 6/1971 | United Kingdom | 426/600 |
| 1576729 | 10/1980 | United Kingdom | 426/600 |

*Primary Examiner*—R. B. Penland
*Attorney, Agent, or Firm*—Mason, Fenwick & Lawrence

[57] ABSTRACT

A method of enhancing the bitterness of beer by oxidation of $\beta$-acids obtained from a carbon dioxide extract of hops and introducing the resulting hulupone, preferably at least partially purified, into the beer. The extract contains also $\alpha$-acids which are isomerized, separated from the $\beta$-acids, and introduced into the beer. The result is a high yield of bitterness-producing material for use in the brewing process.

8 Claims, No Drawings

METHOD OF ENHANCING THE BITTERNESS OF BEER

This is a continuation of application Ser. No. 721,927, filed Apr. 11, 1985, which issued as U.S. Pat. No. 4,717,580, on Jan. 5, 1988.

This invention relates to the manufacture of beer, and in particular to a method of enhancing the bitter taste of beer.

Hops are used in the manufacture of beer for a variety of reasons, notably to produce certain distinctive elements of taste for the beer. The hops contain $\alpha$-acids or humulones, which on isomerisation to iso-humulones produce a bitter flavour for the beer, $\beta$-acids or lupulones, which are currently not actively used in the manufacture and do not appear in the final form of the beer, and essential oils which impart other distinctive flavours to the beer.

It has previously been proposed, for example in UK Pat. No. 1,236,731, to extract resinous hop material into $\alpha$-acid and $\beta$-acid extracts and to use the $\beta$-acids in enhancing the bitter flavouring effect of the iso-$\alpha$-acids, by oxidising the lupulones in an alkaline medium to hulupones. These latter compounds have a bitter taste comparable with the iso-$\alpha$-acids, and the resultant oxidised mixture has been proposed for addition to the beer, either during boiling of the wort or after fermentation. However, this method has not been applied commercially as the hulupone-containing mixture also includes substantial amounts of other materials which result in the beer being cloudy and generally unacceptable.

It has also been proposed in UK Pat. No. 1,576,729 to produce a liquid carbon dioxide extract of hops by contacting the hops with liquid carbon dioxide at a temperature of not less than $-5°$ C., and thereafter to isolate a primary hop extract of high purity from the liquid carbon dioxide and isomerise the $\alpha$-acids in the extract to iso-$\alpha$-acids. The $\beta$-acids in the extract have been filtered or centrifuged and discarded. The extract is isomerised by treatment with an alkali such as potassium carbonate followed by lowering of the pH by addition of carbon dioxide and cooling. This results in separation of the iso-$\alpha$-acids and $\beta$-acids in the reaction mixture, with the $\beta$-acids being precipitated from the iso-$\alpha$-acid solution. There are however very great practical difficulties in removing the $\beta$-acids from the iso-$\alpha$-acids solution by previously-proposed methods which are based on maximum solidification of the $\beta$-acids followed by filtration. The $\beta$-acids are present in admixture and often form only a viscous mass which spreads on the filtration medium and prevents flow of solution through the filter. Even when the iso-$\alpha$-acids can be separated off, therefore, the $\beta$-acids have had to be discarded as they could not be recovered from the filtration medium.

As the iso-$\alpha$-acids provide the majority of the useful substances in the reaction mixture it has not previously been considered important or practically possible to retrieve the $\beta$-acids, but we have now demonstrated that bitterness of beer can be enhanced economically by effective separation and oxidation of the $\beta$-acids and addition of the oxidised material to the brewing process.

According to the present invention there is provided a method of providing bitter flavour for beer, comprising providing a carbon dioxide extract of hops containing $\alpha$-acids and $\beta$-acids, separating the $\beta$-acids and the $\alpha$-acids, oxidising the $\beta$-acids to produce a mixture containing hulupone and introducing the hulupone into the beer during its manufacture.

The hulupone-containing mixture is preferably subjected to precipitation from an alkaline medium, by reducing the pH of the medium, to precipitate out undesired product and unreacted $\beta$-acid. When the oxidation of the $\beta$-acid is performed in alkaline solution the pH is typically about 9 to 11, and reduction of the pH to about 7 to 8.5 results in precipitation of the undesired material. The pH reduction may be performed by passing carbon dioxide gas through the reaction mixture.

The oxidation of the $\beta$-acids is preferably conducted with molecular oxygen, for example by bubbling gaseous oxygen through the reaction mixture containing the $\beta$-acid. This may be at elevated temperature. The oxidation is preferably carried out in aqueous alkaline solution. This is most effectively a solution of potassium hydroxide, but other bases such as potassium carbonate may be used. The pH is preferably from 9 to 11. Further, the oxidation may be carried out under pressure using for example air as the oxidising agent.

The method of the present invention is preferably carried out following isomerisation of $\alpha$-acid in a mixture of $\alpha$-acids and $\beta$-acids. The process can commence by obtaining an extract of hops formed by extraction with liquid carbon dioxide, this extract being particularly pure and containing mainly $\alpha$-acids, $\beta$-acids and essential oils. This extract is then treated to convert the $\alpha$-acids into iso-$\alpha$-acids from which the main element of bitterness derives, and the remaining unreacted $\beta$-acids are then separated for oxidation.

The hulupones obtained by the method of the invention, and the iso-$\alpha$-acids, may be added into the beer after fermentation to minimise loss.

The $\alpha$-acids and $\beta$-acids are preferably separated after the $\alpha$-acids have been isomerised. The preferable method of separating iso-$\alpha$-acids and $\beta$-acids comprises heating the mixture containing the iso-$\alpha$-acids and the $\beta$-acids to provide the acids in fluid admixture, allowing the $\beta$-acids to separate in a fluid layer from the iso-$\alpha$-acid fluid layer, and withdrawing one of the fluid layers from the other.

Alternatively but less effectively the mixture may be treated to provide a fluid iso-$\alpha$-acids solution and a flocculated $\beta$-acids mass, the iso-$\alpha$-acids solution then being withdrawn by decanting or other means, and the residual $\beta$-acids mass being heated to form a fluid which is then recovered.

The $\beta$-acids may be rendered fluid by heating to more than 50° C., preferably to 70°–100° C. at which temperature an aqueous fluid admixture of iso-$\alpha$-acids and $\beta$-acids forms, on settling, upper and lower clearly-defined layers, the upper layer being aqueous containing the iso-$\alpha$-acids and the lower layer being fluid $\beta$-acids. When the method is performed in a container which tapers towards its base and which has a valve at its base, the lower $\beta$-acids fluid layer can be drawn off through the valve, leaving the iso-$\alpha$-acids in the container for subsequent recovery.

The carbon dioxide extract is preferably a liquid carbon dioxide extract, although supercritical fluid carbon dioxide extracts have also been successfully used.

The method of this invention is a departure from the prior art in which the teaching is directed towards obtaining a sufficiently solid $\beta$-acids phase to allow filtration, but in which such a step has proved so impractical that the efficiency of the process has fallen below an economic level.

The present method not only allows easy separation of the iso-α-acids but also allows the β-acids to be recovered for oxidation and addition to the brewing process to enhance the bitterness and increase the process yield.

This can be enhanced by purifying the oxidised β-acids to remove co-existing lupuloxinic acid, by decarboxylating the lupuloxinic acid to lupulenol at reduced pH, for example around 4.5, at which the lupulenol precipitates from solution and can then easily be separated.

Hulupones and lupuloxinic acid are strong acids with low pKa values thus remaining in solution at pH 4.5, but lupulenol is only a very weak acid and precipitated from solution at low pH. The weakness of acidity of the lupulenol compared with the hulupones therefore provided the route for removing the lupuloxinic acid.

The pH of the mixture containing iso-α-aicds and β-acids is preferably kept below 9, most preferably below 8.5, during the separation to ensure that the two fluid layers remain clearly distinct and to prevent hydrolysis of the mixture to humulinic acid, which is useless to the brewing process. However, the pH should not be allowed to fall below 7.5, preferably 8, as this can result in loss of iso-α-acid.

The temperature during separation is preferably kept below boiling, otherwise there is a danger of humulinic acid formation.

The separation time can be reduced if required by centrifuging the mixture of iso-α-acids and β-acids and thereby enforcing the formation of the more dense layer of β-acids.

The method starting with the liquid carbon dioxide extract of hops may be used as a supplement to the bittering effect of hops added earlier in the beer manufacture, or may be used to the exclusion of these hops if desired.

Further according to the invention there is provided a method of separating iso-α-acids and β-acids in a mixture, comprising heating the mixture to render the mixture liquid, allowing the heating liquid mixture to separate into a first liquid layer containing the iso-α-acids and a second liquid layer containign the β-acids, and withdrawing the liquid of one of said layers from the other of said layers.

Still further the invention provides a method of providing bitter flavour for beer, comprising providing a carbon dioxide extract of hops containing α-acids and β-acids, isomerising the β-acids, separating the resulting iso-α-acids from the β-acids, introducing the resulting iso-α-acids into beer during its manufacture, oxidising the β-acids to produce a mixture containing hulupone and lupuloxinic acid, separating the hulupone and the lupuloxinic aicd and introducing the hulupone into the beer during its manufacture.

Embodiments of this invention will now be described by way of illustration in the following Examples with reference to the accompanying schematic drawing which is a flow diagram illustrating the method of the present invention.

EXAMPLE 1

A batch of 1000 liters of deionised water was introduced to a jacketed fermentation vessel 1 and heated to 90° C. In order to remove dissolved oxygen periodic nitrogen sparging took place in 10–15 sec bursts. Previously melted hop extract—liquid $CO_2$ base Styrian Golding or Super Styrian—was then added to the vessel to give a final concentration of 2–3% of α-acids.

1.7–1.9% weight/volume potassium carbonate (anhydrous) was added slowly with nitrogen sparging taking place during addition to ensure quick mixing and solution. This avoided the formation of local high pH areas which could result in humulinic acid formation. The initial potassium carbonate concentration in the reaction mixture was 1.7–1.9% w/v.

The vessel 1 was then steam heated to boiling (101°–102° C.) and, with periodic addition of further potassium carbonate, boiled gently to allow full isomerisation of the α-acids to take place. The duration of boil for 1.75% potassium carbonate was 2–2.5 hours. Samples were taken every 20 minutes for HPLC analysis and the results reported within 20 minutes. This enabled the isomerisation process to be monitored and the boil continued until all the α-acid was isomerised, without humulinic acid being formed. Mild conditions were deliberately chosen to avoid this.

After the boil the vessel 1 was allowed to stand hot for approximately 10 minutes to allow waxes and uncharacterised resins to form a dense surface layer with a sharp interface, and the contents of the vessel 1 were then transferred to another vessel 2 through a plate heat exchanger 3 in which they were cooled to 80° C. The heat exchanger 3 was not essential but was included in this particular case to give flexibility of temperature control. Care was taken towards the end of the transfer to ensure that no waxes were carried forward. With care and attention a good separation was achieved and the hot waxes and other residual materials were run into cans or buckets at the end of transfer.

The pH of the isomerised mixture was then lowered by sparging with $CO_2$ to about 8 to bring β-acids out of the mixture as a discrete fluid layer. The vessel 2 was then allowed to stand overnight at 80° C. to allow the β-acids to coagulate and settle in the cone of the vessel 2. It was important to maintain an elevated cone temperature to enable the β-acids to be run-off as a mobile liquid. If the β-acids were allowed to cool in the vessel 2 separation was impossible as crystals were formed which adhered to all the internal surfaces of the vessel.

The lower liquid layer of β-acids was then run off from the vessel 2, leaving the upper liquid layer of isohumulone (iso-α-acid) solution. This resulting isohumulone solution was chilled to 15° C. using a plate heat exchanger 4 and once cold the solution was single pass filtered through a filter 5, using standard grade kieselguhr, and stored in 50 liter kegs. Dissolved oxygen was kept to a minimum throughout by using nitrogen to pressurise the vessels and sparge the extract after filtration. ($CO_2$ could not be used as this alters the pH).

The liquid β-acids run off from the vessel 2 were then dissolved in a 1000 litres of a 1% aqueous potassium hydroxide solution at a rate of 3% w/v of β-acids. The resulting solution was heated to 70°–90° C. (preferably 90° C.) and gaseous oxygen was bubbled through for 3–5 hours (preferably 3.5 hours). The reaction was monitored hourly by high-pressure liquid chromatography.

After 3.5 hours the lupulones concentration had fallen from 30,000 ppm to zero and hulupone concentration had risen to 9000 ppm.

Gaseous carbon dioxide was then bubbled through the reaction mixture to reduce the pH to 7–7.5, and the unreacted lupulones precipitated out from around pH 8.5, leaving the hulupone in solution. The precipitated lupulone was then removed by filtration to leave a bitter, yellow solution of hulupone and lupuloxinic acid.

The hulupone and lupuloxinic acid were present in the solution in approximately equal amounts, and the solution could then be passed in that condition for addition with the iso-α-acids to beer following its fermentation stage of manufacture. Alternatively and preferably the solution was purified to remove the lupuloxinic acid by reducing the pH of the solution to 4.5 using sulphuric acid, and boiling the solution to convert the lupuloxinic acid to lupulenol by decarboxylation. The lupulenol precipitated as an oil from the solution at pH 4.5 leaving the hulupone as the only significant dissolved substance, this being confirmed by high-pressure liquid chromatography and mass spectroscopy. The lupulenol was then separated by running off, and the remaining solution of hulupones was filtered to remove solid impurities.

The iso-α-acids, essential oils and the hulupones solutions were then added to beer following its fermentation stage of manufacture, to impart bitter taste and other flavouring to the beer.

EXAMPLE 2

The method was conducted generally as described in Example 1. However, the oxidation of β-acids was performed using air instead of gaseous oxygen.

The liquid-β-acids from the vessel 2 were dissolved in 1000 litres of 1% aqueous potassium hydroxide at a rate of 2% w/v of β-acids. The solution was heated to 95° C. and air was bubbled through under a top pressure of 20 psig for 2-3 hours until HPLC showed that all the β-acids were oxidised.

Further, following oxidation of the β-acids the pH of the reaction mixture was reduced to 4.5 using diluted mineral acid (specifically in this case hydrochloric acid) in a single step, thereby avoiding the intermediate pH reduction with gaseous carbon dioxide. The solution was then boiled at pH 4.5 as in Example 1.

The effect of this was to allow the unreacted lupulone and the formed lupulenol to be precipitated along with other impurities in a single step.

Around 30-35% yield of hulupone was obtained by its oxidation from the β-acids, and this allied to the 95% yield of iso-α-acids from the isomerisation stage from the liquid carbon dioxide hop extract resulted in an excellent production of compounds imparting bitterness to the beer. On the basis of an initial 2:1 content of α-acids : β-acids in hops, the oxidation of the β-acids produced a 15% increase in the yield of bitterness compared to conventional processes.

The following Table shows the results obtained in the formation and separation of the iso-α-acids and β-acids in a typical example of the process.

TABLE

| Stage of Process | ppm ISO - α | ppm α | pH | Humulinic Acid |
|---|---|---|---|---|
| Start of Boil | 2,720 | 21,316 | 9.41 | Nil |
| 20 Mins Boil | 12,250 | 15,850 | 9.30 | Nil |
| 40 Mins Boil | 15,800 | 12,296 | 9.31 | Nil |
| 60 Mins Boil | 20,154 | 8,814 | 9.28 | Nil |
| 80 Mins Boil | 22,310 | 6,274 | 9.33 | Nil |
| 100 Mins Boil | 22,600 | 4,432 | 9.30 | Nil |
| 120 Mins Boil | 21,800 | 2,826 | 9.26 | Nil |
| 140 Mins Boil | 21,000 | 1,698 | 9.24 | Nil |
| After Transfer to remove waxes | 25,438 | 1,832 | 9.30 | Nil |
| After acid pptn | 26,346 | 786 | 7.90 | Nil |
| Rough Beer Tank prior to filter | 23,352 | 752 | 7.70 | Nil |

TABLE-continued

| Stage of Process | ppm ISO - α | ppm α | pH | Humulinic Acid |
|---|---|---|---|---|
| Start Filtration | 22,524 | 774 | 8.05 | Nil |
| Middle Filtration | 23,922 | 790 | 7.90 | Nil |
| End Filtration | 21,784 | 730 | 8.04 | Nil |
| Bright Beer Tank prior to Kegging | 22,076 | 674 | 8.03 | Nil |
| Keg 3 | 21,162 | 806 | 7.95 | Nil |
| Keg 11 | 21,368 | 880 | 7.90 | Nil |

In order to keep oxygen levels low, the vessel containing the filtered extract was sparged with nitrogen with the top vent open. This technique was instrumental in lowering the dissolved oxygen from 2000 ppb to <150 ppb. Kegs used for storage of filtered extract were steamed but not $CO_2$ purged as $CO_2$ affects the pH and clarity of the filtered extract.

It is recommended to use de-ionised water at all stages of the process in order to minimise the content of metal ions, especially calcium and magnesium.

The isomerisation reaction itself yielded 100% of iso-α-acid when the α-acid concentration was 5000 ppm, although small amounts of iso-α-acid were subsequently lost in practice, for example in transfer from one vessel to another, by entrapment in the waxes and during filtration.

The method described in the above embodiment of the invention allowed easy and effective separation of the β-acids and iso-α-acids by maintaining the β-acids in liquid form and simply running them off from the bottom of vessel 2. This transformed the practical usefulness of the $CO_2$ hop extract as a starting material in the brewing process, and very high yields were obtainable, especially on oxidation of the β-acids to hulupones and addition of these materials into the brewing process to enhance the bitterness of the beer.

A further considerable advantage of the method described in this Example is that no organic solvents or reagents are used, the materials being potassium carbonate (although other alkalis such as potassium hydroxide may be used), water, oxygen and carbon dioxide, all of which are presently used in conventional brewing processes.

Hitherto, β-acids remaining after the isomerisation of the α-acids have in practice simply been discarded and have not been used for enhancing the bitterness of the beer; the bitter taste has been provided by the iso-α-acids only, despite suggestions in the literature that β-acids may be further employed. The use in the above Example of the liquid carbon dioxide hop extract is of significance in allowing the β-acids to be separated and further processed without interference from other materials present in, for example, methylene chloride hop extracts which are currently in use in conventional processes.

Modifications and improvements may be made without departing from the scope of the invention.

We claim:

1. A method of separating iso-alpha-acids and beta-acids in a mixture, said method consisting essentially of the steps of:
   providing a mixture of iso-alpha-acids and beta-acids;
   adjusting the pH of the mixture to a pH in the range between 7.5 and 9;
   heating the mixture to a temperature below boiling so as to render the mixture fluid while avoiding humulinic acid formation;

allowing the heated fluid mixture to separate into a first liquid layer and a second liquid layer, said first liquid layer being an aqueous layer containing the iso-alpha-acids, the second liquid layer containing the beta-acids; and withdrawing the liquid of one of said first and second liquid layers from the other of said liquid layers to separate said layers hence separately to recover the iso-alpha-acids in liquid form and the beta-acids in liquid form.

2. A method as claimed in claim 1, wherein the pH of the mixture is adjusted to a pH in the range between 8 and 8.5.

3. A method as claimed in claim 1, wherein the mixture is heated to a temperature in a range above 50 degrees centigrade and less than boiling point.

4. A method as claimed in claim 3, wherein the mixture is heated to a temperature in the range of 70 degrees centigrade to 100 degrees centigrade.

5. A method as claimed in claim 1, wherein the step of allowing the heated fluid mixture to separate into said first liquid layer and said second liquid layer includes the step of allowing said fluid mixture to settle to form clearly defined upper and lower liquid layers, the upper liquid layer being said aqueous layer containing the iso-alpha-acids, and the lower liquid layer being the liquid layer containing the beta-acids.

6. A method as claimed in claim 5, wherein the step of allowing the heated fluid mixture to separate into said first liquid layer and said second liquid layer includes performing said step in a vessel having a conical lower end, and withdrawing the liquid layer containing the beta-acids through said conical lower end while leaving the liquid layer containing the iso-alpha-acids in the vessel for subsequent recovery.

7. A method as claimed in claim 1, wherein said step of allowing the heated fluid mixture to separate into said first and second liquid layers is accelerated by centrifuging the heated fluid mixture and thereby densifying the layer of beta-acids.

8. A method as claimed in claim 1, wherein said step of allowing the heated fluid mixture to separate includes centrifuging the fluid mixture to densify the beta-acid layer.

* * * * *